United States Patent [19]

Lin et al.

[11] Patent Number: 4,672,545
[45] Date of Patent: Jun. 9, 1987

[54] METHOD AND APPARATUS FOR SYNTHESIZING THREE DIMENSIONAL SEISMIC DATA

[75] Inventors: Jia-Wen Lin, Houston; Tom C. Holloway, Katy, both of Tex.

[73] Assignee: Pennzoil Company, Houston, Tex.

[21] Appl. No.: 597,598

[22] Filed: Apr. 6, 1984

[51] Int. Cl.⁴ .......................... G01V 1/00; G01V 1/32
[52] U.S. Cl. ...................... 364/421; 367/61; 367/73
[58] Field of Search ...................... 367/61, 73, 56, 43, 367/72; 364/421, 422

[56] References Cited

U.S. PATENT DOCUMENTS

| | | | |
|---|---|---|---|
| 3,622,967 | 11/1971 | Foster et al. | 340/1.5 |
| 3,668,619 | 6/1972 | Dennis | 367/72 X |
| 3,705,382 | 12/1972 | Quay | 340/1.5 CC |
| 3,838,390 | 9/1974 | Michon | 340/1.5 CC |
| 3,885,225 | 5/1975 | Anstey et al. | 367/56 X |
| 3,906,352 | 9/1975 | Parker | 340/7 R |
| 3,931,609 | 1/1976 | Anstey | 367/72 |
| 4,068,208 | 1/1978 | Rice et al. | 367/19 |
| 4,210,946 | 7/1980 | Lindseth | 367/46 |
| 4,241,429 | 12/1980 | Bloomquist | 367/52 |
| 4,259,733 | 3/1981 | Taner | 367/61 |
| 4,293,933 | 10/1981 | Park et al. | 367/73 X |
| 4,295,213 | 10/1981 | Mifsud | 364/421 |
| 4,298,968 | 11/1981 | Ruehle et al. | 364/421 X |
| 4,330,872 | 5/1982 | Bratton | 367/43 |
| 4,363,113 | 12/1982 | Taner et al. | 364/421 |
| 4,415,999 | 11/1983 | Moeckel et al. | 367/73 |

OTHER PUBLICATIONS

Society of Exploration Geophysicists, Abstract of 1983, Las Vegas Conference, Steve Chilcoat and Chen Yu Wang, Sohio Petroleum, pp. 562-564.

Primary Examiner—Joseph Ruggiero
Assistant Examiner—Charles B. Meyer
Attorney, Agent, or Firm—Lowe, Price, LeBlanc, Becker & Shur

[57] ABSTRACT

Method and apparatus are disclosed for converting seismic data obtained at known points to synthesized seismic traces obtainable at arbitrarily selected points. Two dimensional seismic data are converted to three dimensional data with the aid of a programmed computer to permit generation of arbitrary views of a particular geologic structure as well as a mathematical representation of the structure. In order to provide accurate interpolation from the known data, both apparent and true dip characteristics are obtained for the surveyed structure, and seismic trace data for a desired point are synthesized as a function of the dip of the surveyed structure. The dip characteristics are obtained from partial derivatives of the two dimensional data in specified coordinate directions. A three dimensional surface corresponding to the dip characteristics is obtained by a least squares fitting technique. The data obtained at the known points are weighted both by distance from the desired point and the semblance coefficients associated with dip for these points to synthesize the desired data.

34 Claims, 9 Drawing Figures

METHOD AND APPARATUS FOR SYNTHESIZING THREE DIMENSIONAL SEISMIC DATA

TECHNICAL FIELD

This invention relates to seismic prospecting, by reflection or diffraction of various signals provided to interfaces between geologic structures, and more particularly to method and apparatus for synthesizing seismic traces obtainable at arbitrary points by obtaining apparent and true dip data for a structure or surface being surveyed, in order to provide three dimensional seismic signal data as a function of two dimensional seismic data obtained at other points.

BACKGROUND ART

In seismic prospecting as contemplated herein, there is provided a source of energy, typically sonic energy, which is generated adjacent the surface of the earth or of a body of water in offshore prospecting. The generated energy travels through the earth or water medium to discontinuities and interfaces among various strata thereof. At each such discontinuity or interface, there is provided both a reflected and a diffracted seismic wave. These waves in turn return to the surface and are detected by a plurality of seismic transducers, or geophones, which may be arranged along a seismic line having a particular geographic orientation. The magnitude and phase displacement between the returning signals and the originally generated signals are indicative of the displacement between the source of the seismic signals and the reflecting and/or diffracting interface. The data obtained by a plurality of linear arrangements of such transducers may be used to map the various interfaces and discontinuities.

For offshore prospecting, wherein a plurality of geophones may be spaced fairly closely to one another (approximately 82 feet apart, for example) along a single seismic line, the various lines are typically placed on the order of one-half mile to one mile apart from one another. Thus, although return data are relatively dense in a longitudinal direction determined along the seismic lines of geophones, these data are nonetheless relatively sparse in the direction transverse thereto. Any determinations of dip and/or strike in the transverse direction are thus subject to error because of the relatively large transverse discontinuities between transducers.

In order to provide more accurate representation of subsurface geological structures, more detailed sampling of the subsurface areas are required. Such increased detail is available by providing more dense, three dimensional, seismic coverage over the exploration area, rather than standard two dimensional data collected by individual lines of receives to provide a profile representation of the surveyed structures. In the three dimensional seismic prospecting process, the seismic lines of transducers are repositioned at substantially closer transverse intervals to one another than in the conventional approach.

By obtaining the more densely and uniformly packed seismic data, the spurious assumption that the surveyed geologic structure is two dimensional is no longer required. Thus, the received data are manipulated and processed as a true three dimensional wave field, in accordance with correct physical principles. With such processing, the received seismic energy is better imaged to reveal the subsurface geology than the two dimensional representations thereof. Additionally, the availability of three dimensional data permits an interpreter to view the surveyed structure in a three dimensional perspective, either through a time-slice of the seismic data or by obtaining a vertical slice at any orientation. Such flexibility in display makes the seismic interpretation easier, faster and more accurate.

However, because of the time consumptive nature of the seismic prospecting process, it is substantially more expensive to obtain such more highly densely packed three dimensional data than it is to obtain the standard (two dimensional) prospecting data. There is accordingly a need in the prior art to provide a method and apparatus for obtaining three dimensional, densely packed, seismic prospecting data in a less expensive manner, thereby to enable more accurate seismic prospecting of geologic structures.

More specifically, it is desirable to be able to regrid existing two dimensional data in a manner to provide three dimensional seismic data, thereby enabling large quantities of data to be evaluated quickly and accurately. A number of unsuccessful attempts have been made in the prior art to regrid such two dimensional data with the aid of varying computational techniques. In addition to requiring seismic data obtained by perpendicular seismic lines, a further significant problem with the prior art is the inability of such regridding programs to function for structures which deviate from a very flat configuration between the points mapped by the two dimensional technique. There is thus a need in the prior art to provide a method for regridding two dimensional data to provide a true three dimensional representation of the surveyed structure.

It is accordingly an object of the present invention to overcome the difficulties of the prior art and to provide three dimensional, or densely packed, seismic data in a seismic exploration process.

It is a more specific object of the invention to provide such three dimensional seismic prospecting data without requiring a more dense and expensive positioning of various geophones for receiving the reflected and diffracted seismic signals.

It is another object of the invention to provide a method and apparatus for converting sparse, two dimensional, data representative of a geological structure or surface to more accurate and densely packed three dimensional data representative thereof.

It is still another object of the invention to obtain a mathematical representation of the geologic structure being surveyed by performing operations on sparse, two dimensional, seismic data signals representative thereof.

An additional object of the invention is the conversion of two dimensional seismic data to three dimensional, more densely packed, data representative of a geologic surface corresponding to the surveyed structure.

Still another object of the invention is the provision of data descriptive of a geologic structure, obtainable at any arbitrarily selected point with respect to said structure, from previously obtained two dimensional seismic prospecting data representing said structure.

Yet a further object of the invention is to provision of data obtainable by a seismic line, disposed at an arbitrary orientation with respect to a geologic surface, from standard two dimensional prospecting data descriptive of the structure.

It is a further object of the invention to convert sparse, two dimensional, seismic data descriptive of a geologic structure to dense, three dimensional, data descriptive of the structure without the necessity of placing additional lines of transducers or of obtaining additional data.

Yet another object of the invention is the provision of regridded three dimensional seismic data from existing two dimensional data representing a geologic structure.

DISCLOSURE OF INVENTION

To achieve the foregoing and other objects, and in accordance with the purposes of the present invention as described herein, an improved method and apparatus are provided for synthesizing seismic traces at arbitrary points, thereby to provide densely packed, high resolution, three dimensional seismic data representative of a geologic structure surveyed by sparse, two dimensional, techniques. The synthesizing apparatus includes an input means for the two dimensional data representative of the structure. Additionally, first and second calculating means are provided. The first calculating means calculates apparent dip characteristics of the structure from the two dimensional data, and the second calculating means determines a three dimensional surface from the calculated apparent dip of the two dimensional data and further generates data representing the surface. Trace generating means is further provided for combining the three dimensional surface data with the two dimensional data in order to generate synthesized seismic traces obtainable at points having arbitrary positions.

In accordance with another object of the invention, the trace generating means further includes a third calculating means for calculating seismic trace data obtainable by a seismic receptor at identified locations with respect to the geologic structure as a function of the location, of the input seismic data, and of the three dimensional surface data.

In still a further aspect of the invention, the third calculating means may include an interpolator to obtain the seismic data at various arbitrarily selected points, the interpolator including weighting circuitry to weight two dimensional data more heavily in computing the three dimensional data when closer to the point for which the three dimensional data is being calculated. The weighting means may further weight the two dimensional data in accordance with semblance coefficients associated with that data.

The output seismic data may be displayed or may be printed, to represent seismic line data obtainable at an arbitrary seismic line location.

In accordance with an additional feature of the invention, the second calculating means may include circuitry for obtaining partial derivative data for the two dimensional seismic data, with respect to the direction of orientation of a seismic line used to attain the data. The second calculating means may further include means for deriving the three dimensional data from the partial derivatives when taken together with the two dimensional data.

In accordance with yet another aspect of the invention, there are provided input means for receiving the two dimensional data, together with semblance calculating means for obtaining semblance coefficients for the two dimensional data signals. An apparent dip calculating means is provided, operable in response to the semblance coefficients, for calculating apparent dip of the surveyed surface. A seismic data calculating means is operable in response to the apparent dip for synthesizing a seismic data signal trace obtainable at an arbitrary location intermediate locations surveyed and represented by data included in said two dimensional data signals.

A surface calculating device is provided to calculate a surface function descriptive of the surveyed surface as a function of the apparent dip. The surface function may be fitted to apparent dips of the two dimensional data by a least-squares error technique. A synthesizer is responsive to the generated surface data for determining and synthesizing therefrom a seismic data trace receivable at the arbitrary location.

A plurality of synthesized seismic data traces may be combined to represent pickup points along a hypothetical seismic line, thus to provide synthesized data representative of a survey along a hypothetical seismic line location.

Additional objects, advantages and other novel features of the invention will be set forth in part in the description which follows and in part will become apparent to those skilled in the art upon examination of the following or may be learned with the practice of the invention. The objects and advantages may be realized and attained by means of the instrumentalities and combinations particularly pointed out in the appended claims.

BRIEF DESCRIPTION OF THE DRAWINGS

The accompanying drawings, incorporated into and forming a part of the specification, illustrate several aspect of the present invention and, together with the description, serve to explain the principles of the invention. In the drawings.

Reference will now be made in detail to the present preferred embodiment of the invention, an example of which is illustrated in the accompanying drawings.

BEST MODE FOR CARRYING OUT THE INVENTION

As is apparent from the foregoing discussion of the background of the invention, method and apparatus for obtaining seismic traces as indications of geologic structures and interfaces between such structures are well known in the prior art. The present invention permits the plotting of accurate seismic data for points at which no such data were actually obtained. That is, seismic traces are synthesized for points intermediate points at which seismic signals were actually received. A novel aspect of the present invention is the provision of method and apparatus for determining the three dimensional surface data for the geologic structures being surveyed, the geologic structure information thereafter being used in synthesizing the seismic traces at desired locations.

Figure 1A:
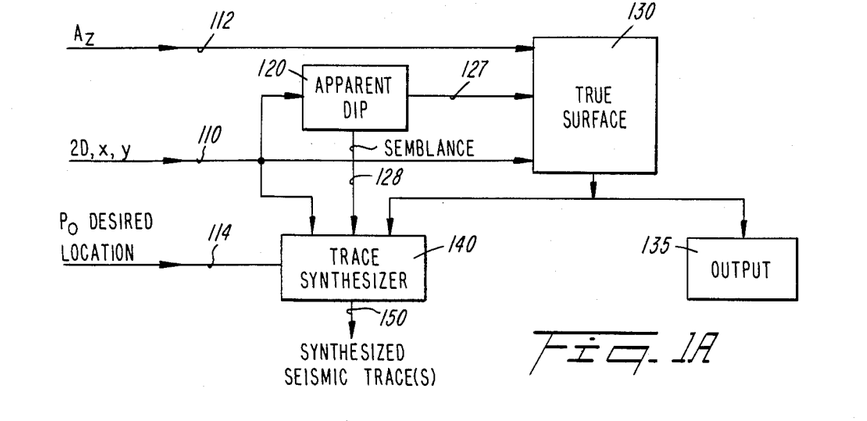
FIG. 1A broadly shows a system in accordance with the present invention for providing one or more synthesized seismic traces at arbitrary desired locations from input two dimensional seismic signals together with azimuth data therefor.

Referring now to FIG. 1A, there is broadly shown, in block diagram format, an illustration of a structure embodying the present invention. As shown therein, input signals, conveying two dimensional seismic information obtained along one or more seismic lines shown in FIG. 1B, together with the azimuthal orientation (Az) of that line, are provided on input lines 110 and 112, respectively. More specifically, although single lines are shown at 110 and 112, it should be recognized that a plurality of input lines may be included in a cable providing the input signals to various computing components of the inventive structure.

Thus, on line 110 there are provided the standard, two dimensional, seismic data obtained as a plurality of seismic traces along the line S including a plurality of geophones (not shown). For each set of data obtained on a particular seismic line and providing on line 110, there is provided on line 112 the azimuth information identifying the location and orientation of the seismic line used to obtain the data.

Also input to the inventive structure is information on line 114 identifying the location of a point for which a seismic trace is desired.

The seismic data obtained from the plurality of geophones are provided to an arbitrary first computing device 120, which may be an appropriately programmed computer for example, for calculating apparent dip information for the geologic structure observed along the seismic line. This seismic time dip is a measurement of time step-out across the plurality of seismic traces and may be measured directly and accurately from the received seismic data in accordance with well known processes.

In order to obtain a dip angle section, representing the time dip for data taken along the seismic line, the dip angle is preferably determined at each time sample for each of the seismic traces forming the original seismic data. The resulting dip angle information thus corresponds to the data points observed in the original seismic line profile of the geologic structure.

It should be noted, however, that the time dip observed along a number of seismic traces taken along a seismic line does not necessarily reflect the true dip of the underlying geologic structure, but merely provides an apparent dip thereof. Specifically, if the data were reflected or diffracted only by points along the structure which are vertically below the seismic line, or alternatively only by points having a particular fixed angular inclination with respect to the line, then an actual correlation would exist between the observed time dip and the actual dip of the structure. However, inasmuch as the signals received by the various geophones along the seismic line in fact may be reflected by additional points, or by a single point at different times, the time dip observed along the several seismic traces merely provided an apparent dip for the underlying geologic structure and is not necessarily the true dip of the geologic structure immediately below the line.

The present invention accordingly provides a second computing device 130 for calculating the data representing the actual surface variations of the underlying geologic structure. As will be apparent from the following description, the surface calculator 130 provides information useful in obtaining the desired synthesized seismic trace as an interpolation of data obtained at actual seismic trace points on seismic lines of any orientation. Moreover, the apparent dip data are used to obtain a mathematical formulation of the actual geologic structure being surveyed by utilization of a least-squares fitting method. The three dimensional surface thus obtained is useful in permitting an interpreter to observe the geologic structure in a three dimensional perspective, either through a time slice of the seismic data representing an elevation at an arbitrary depth or through a vertical slice obtained at any orientation, simulating data obtainable by an arbitrarily placed seismic line without the necessity of incurring the expense of such a procedure. Toward that end, the output data of the calculator 130 may be stored for subsequent access and for output either as a display or as a hard copy, as symbolized by an output device 135. As will be further apparent from the following discussion, the structural data are calculated by the device 130 as a function of the apparent dip information produced by the first computing device 120, as well as azimuthal data provided on line 112 and the seismic data provided on line 110.

With the aid of the true surface structure data, the two dimensional seismic data input on line 110 may be appropriately interpolated to provide a synthesized seismic trace for any desired location, identified by input data provided on line 114, by a trace synthesizer 140.

A significant advantage of the present invention is the provision of semblance coefficients, which are used by the first computing device 120 to select an apparent dip, to the trace synthesizer. The semblance coefficients are used to weight the contributions of the actual seismic traces obtained along the survey lines in synthesizing the trace for the desired location. The calculated structure is used to vary the observed seismic data to provide an interpolated value for the desired location.

The structure of FIG. 1A thus provides an output at line 150 representing a seismic trace observable at a desired location indicated by data input on line 114, based on the semblance coefficients obtained for the apparent dip, on the actually observed two dimensional seismic data, and on the computed three dimensional geologic structural data. By synthesizing seismic traces for a plurality of locations distributed along a particular line, it should be clear that a complete vertical seismic profile may be obtained, illustrating the data obtainable along a line of seimic transducers at an arbitrary location.

Figure 2:
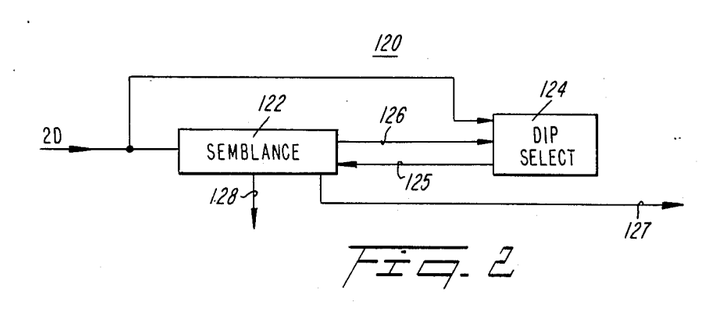
FIG. 2 shows the apparent dip calculator of FIG. 1A in greater detail.
Figure 3:
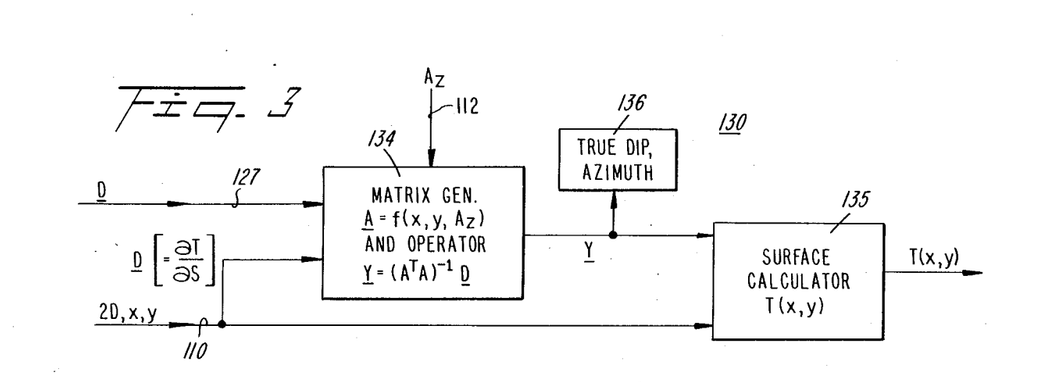
FIG. 3 shows details of a true dip calculator utilized in FIG. 1A.
Figure 4:
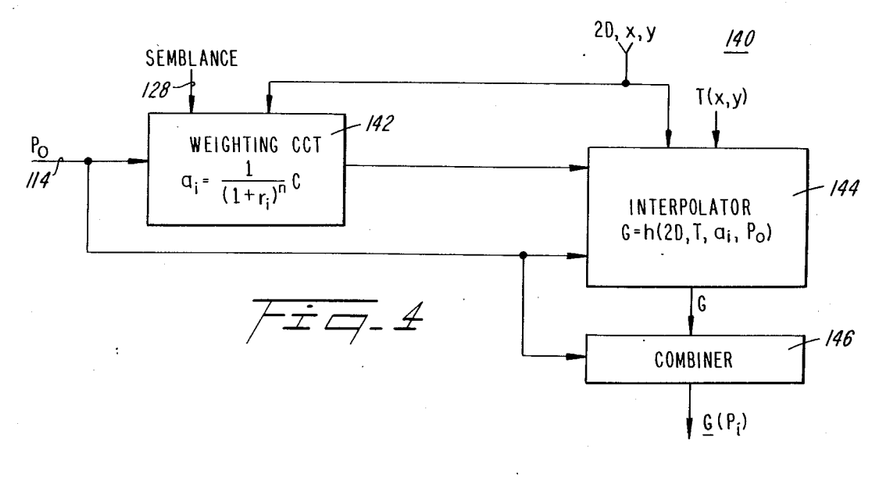
FIG. 4 provides additional details of a trace synthesizer in FIG. 1A.

FIGS. 2, 3 and 4 provide details of components shown at 120, 130 and 140 in FIG. 1A, respectively. Thus, as shown at FIG. 2, the apparent dip calculator 120 may in fact comprise a semblance coefficient calculator 122 and a trial dip selecting circuit 124. In operation, for each trial dip value selected by circuit 124 the semblance coefficient calculator computes a semblance, or coherence, coefficient in a manner known in the art. The semblance coefficient is determined for each trial dip value and the dip value having the largest semblance coefficient is selected as the apparent dip for the particular data point under consideration.

More specifically, the apparent dip at a specific data point is determined by setting a time window, centered about the data point, and determining a coherence value for dip lines drawn within that window across several traces, ranging from a maximum negative dip angle to a maximum positive dip angle by successive small dip angle increments. The semblance coefficient calculator 122 performs a coherence test for each trial dip value by calculating a semblance coefficient C in accordance with the expression shown in Equation (1).

$$C = (1/M) \sum_t \left[ \sum_i f_{i,t(i)} \right]^2 / \sum_t \sum_i f_{i,t(i)}^2 \qquad (1)$$

Where:
M is the number of seismic traces,
i denotes the index of the seismic trace,
t denotes the seismic time sample, and
$f_{i,\,t(i)}$ is the seismic amplitude at the $i^{th}$ trace and the $t^{th}$ time sample.

The semblance coefficient is a figure of merit for the trial dip angle value and measures how well the seismic events are lined up for that angle. The apparent dip angle is selected as that angular orientation for which the maximum coherency is detected among all possible orientations, or trial dip values. In the present invention, the semblance coefficient C for the selected dip angle value is saved along with the apparent dip value thus determined.

This coefficient represents a normalized output/input energy ratio and ranges in value from 0 to 1, corresponding to a coherence among the aligned seismic events along the trial dip line ranging from no coherence to perfect coherence, respectively. Thus, for each data point, obtained at every time sample (taken at four millisecond intervals, for example) the apparent dip is selected as that angular orientation for which the seismic events on adjacent traces within the selected time window line up most coherently.

It should be appreciated that for seismic traces having a duration of approximately four seconds, approximately one thousand data samples are obtained when taken at four millisecond intervals. Further, where three hundred geophones are to be used in a single seismic line, the provision of accurate apparent dip information in accordance with the above described method requires the coherence calculations to be performed over selected windows for approximately 300,000 data points. Additionally, a large number of seiismic lines are typically used in order to map a single geologic structure, each line generating data requiring 300,000 complex computations. Accordingly, the apparent dip calculating device 120, and more particularly the semblance coefficient calculator 122, is preferably a high speed, large capacity, programmed digital computer for rapidly performing the abovedescribed computation of Equation (1) for a large number of data points.

In operation, the dip selecting circuit 124 selects a sequence of data points from adjacent seismic traces at incremented dip angles. For each selected combination, there is provided to the coefficient calculator 122 an indication on line 125 of the now current trial dip angle value. In response to receipt of data on line 125, the semblance coefficient calculator 122 computes the semblance coefficients in accordance with Equation (1). After receiving all such trial dip angle values, the largest semblance coefficient computed for that data point is determined, such as by a procedure whereby the trial dip angle and the computed semblance coefficient therefor are stored in a pair of registers only if the computed coefficient is greater than the previously stored value therein.

Upon conclusion of the trial sequence, the semblance coefficient calculator 122 thus outputs a signal on line 126 causing the dip selecting circuit 124 to reset, and at the same time provides on line 127 an output indicative of the stored dip angle value as previously described. Similarly, the calculator 122 outputs on line 128 the semblance coefficient, for use in trace synthesizer 140 as previously described. Thus, the first computing device 120 in fact provides output signals representing the apparent dip for each specific data point and the semblance coefficient for the determined apparent dip to be associated with that data point.

Referring now to FIG. 3, there is shown in greater detail the second computing apparatus 130 used to calculate the surface of the geologic structure.

Figure 1B:
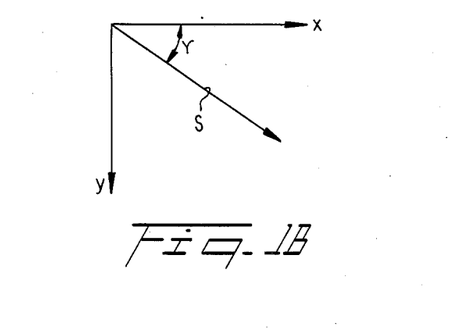
FIG. 1B is a plan view of a line of seismic transducers and its orientation with respect to a pair of coordinate axes.

More specifically, the apparent dip information input on line 127 provides an input signal indicative of the partial derivative of the seismic data with respect to the azimuth direction of the seismic line used to obtain the seismic data. Referring agaíng to FIG. 1B, which shows a seismic line S oriented at an angle $\gamma$ with respect to the rectangular x and y coordinates, it may be concluded that if the azimuthal direction along the seismic line is defined as a direction S, then it is possible to obtain the true surface, T(x,y) from the solution of a partial differential equation of the type shown at Equation (2).

$$\frac{\partial T}{\partial S} = \frac{\partial T}{\partial x} \frac{\partial x}{\partial S} + \frac{\partial T}{\partial y} \frac{\partial y}{\partial S} \qquad (2)$$

Thus, where T represents the surveyed three dimensional structure and S represents the direction of the seismic line observing the data ($\partial T/\partial S$ representing the apparent dip determined by the first computing device 120), applicants have recognized that application of a standard mathematical equation of the type shown in Equation (2) leads to the determination of the three dimensional surface T(x,y) and hence the true dip for the geologic surface being surveyed. This may be seen more specifically with the aid of FIG. 1B wherein it is noted that the relationships of Equation (3) are applicable.

$$\frac{\partial x}{\partial S} = \cos\gamma, \frac{\partial y}{\partial S} = \sin\gamma \qquad (3)$$

Substitution of the values of Equation (3) in Equation (2) results in a scalar Equation (4):

$$\frac{\partial T}{\partial S} = \frac{\partial T}{\partial x} \cos\gamma + \frac{\partial T}{\partial y} \sin\gamma \qquad (4)$$

This equation represents the dip of the geologic surface taken along the seismic line used to obtain the data, shown as $\partial T/\partial S$, in terms of coefficients (cos $\gamma$ and sin $\gamma$) known from azimuthal data and in terms of the directional partial derivatives of the surveyed surface, or the apparent dip, in the x and y coordinate directions. From this equation, a solution may be obtained for T(x,y).

The present invention thus provides apparatus for applying the equations as determined above to obtain a solution for a function T(x,y) representing the surface being surveyed by the many data points.

In order to solve Equation (4), the dipping surface T(x,y) may be assumed to be represented by an arbitrary equation of $k^{th}$ order. For a second order equation, this is shown by Equation (5):

$$T(x,y) = ax^2 + by^2 + cxy + dx + ey + f \tag{5}$$

For such an assumed functional representation of the dipping surface, the partial derivatives required for solution of Equation (4) are represented by Equations (6):

$$\partial T/\partial x = 2ax + cy + d$$
$$\partial T/\partial y = 2by + cx + e \tag{6}$$

Upon substitution of Equations (6) into Equation (4), there results Equation (7):

$$\partial T/\partial Z|D = (2x \cos \gamma)a + (2y \sin \gamma)b + (y \cos \gamma + x \sin \gamma)c + (\cos \gamma)d + (\sin \gamma)e \tag{7}$$

Since the value D is known as a result of the apparent dip computation performed by the first computing structure 120, for particular data points and for particular values of angle $\gamma$ corresponding to actual seismic lines, there is available a substantial quantity of data at various x and y coordinates for solution of the coefficients a through e of Equation (7).

Although any approach for solution of a plurality of equations may be used, a matrix approach, which is easily implemented on programmed digital computers, is preferred. Such a solution is illustrated by the following.

For a single time slice, let it be assumed that N measurements are available from the two dimensional profiles. Where N is larger than the number of coefficients to be determined, the coefficients (a through e in Equation (7)) may be solved by a least-squares method. The N measurements provide N representations of Equation (7) as follows:

$$D_1 = (2x_1\cos \gamma_1)a + (2y_1\sin \gamma_1)b + (y_1\sin \gamma_1 + x_1\cos \gamma_1)c + (\sin \gamma_1)d + (\cos \gamma_1)e \tag{7}$$

$$D_2 = (2x_2\cos \gamma_2)a + (2y_2\sin \gamma_2)b + (y_2\sin \gamma_2 + x_2\cos \gamma_2)c + (\sin \gamma_2)d + (\sin \gamma_2)e$$

$$D_N = (2x_N\cos \gamma_N)a + (2y_N\sin \gamma_N)b + (y_N\sin \gamma_N + x_N\cos \gamma_N)c + (\sin \gamma_N)d + (\cos \gamma_N)e$$

In matrix form, the above system of equations may be written as Equation (8):

$$\underline{A}\,\underline{Y} = \underline{T} \tag{8}$$

Where:

$$\underline{T} = \begin{bmatrix} D_1 \\ D_2 \\ \cdot \\ \cdot \\ \cdot \\ D_N \end{bmatrix},$$

$$\underline{A} = \begin{bmatrix} 2x_1\cos\gamma_1 & 2y_1\sin\gamma_1 & y_1\sin\gamma_1 + x_1\cos\gamma_1 & \sin\gamma_1 & \cos\gamma_1 \\ 2x_2\cos\gamma_2 & 2y_2\sin\gamma_2 & y_2\sin\gamma_2 + x_2\cos\gamma_2 & \sin\gamma_2 & \cos\gamma_2 \\ \cdot & & & & \\ \cdot & & & & \\ \cdot & & & & \\ 2x_N\cos\gamma_N & 2y_N\sin\gamma_N & y_N\sin\gamma_N + x_N\cos\gamma_N & \sin\gamma_N & \cos\gamma_N \end{bmatrix}$$

$$\underline{Y} = \begin{bmatrix} a \\ b \\ c \\ d \\ e \end{bmatrix}$$

The least-squares solution for the matrix Equation (8) is given by:

$$\underline{Y} = (\underline{A}^T \underline{A})^{-1} \underline{D} \tag{9}$$

where superscripts $-1$ and T denote the inverse and transpose, respectively, of a matrix.

The above computation is carried out by a matrix generator and calculator 134 shown in FIG. 3, wherein the matrix A is found as a function of azimuthal angle $\gamma$ of seismic lines and of the x and y coordinate locations of individual data points, as shown above, and wherein the individual coefficients of the surface Equation (5) are found by the matrix transposition and inversion operation represented by Equation (9).

It is noted that coefficient f of the time surface equation is omitted from the entire calculation. This result occurs because the dip involves only partial derivatives, and any constant term shoould play no role in the calculation. Except for this unimportant DC shift (represented by a constant time shift), the time representation of the surveyed surface is thus entirely determined from the estimated coefficients. Specifically, having determined the coefficienfts a, b, c, d and e, the equation describing the surface being surveyed is easily determined from Equation (5), within the above mentioned constant shift. Substitution of the coefficients in the equation is accomplished by a calculator 135 which provides an output indicative of the surface for any desired coordinate pair x, y. Since the present apparatus measures only a rate of time changes in seismologic phenomena, the coefficient f is not necessary to practice the invention.

Moreover, once the coefficents have been determined, apparent dip in any direction can be calculated from Equations (4) and (6) and, moreover, true dip and true azimuth are given by:

$$\text{True dip} = \sqrt{(\partial T/\partial x)^2 + (\partial T/\partial y)^2} \tag{10}$$
$$\text{True azimuth} = \tan^{-1}[(\partial T/\partial y)/(\partial T/\partial x)] \tag{11}$$

These operations may, if desired, be implemented in a straightforward manner on a programmed computer, as illustrated by a calculating apparatus 136 of FIG. 3. This device, in response to input coefficients $\underline{Y}$ and to the input location data for a specified point, may thus compute the partial derivatives of the surface equation in Equations (6), and then determine therefrom the true dip and azimuth in accordance with Equations (10) and (11).

It should be pointed out that in the least squares calculation,, the semblance coefficients from the dip search program carried out by the first computing device 120 are used as statistical weighting factors so that the structure surface will represent the "good" dip values more heavily than the "poor" values.

Inasmuch as the surveyed structural surface is better approximated by local application of a mathematical surface to the data, the surface fittings contemplated by Equation (9) are done in a predetermined small area. The area is moved for each fitting, with a predetermined overlap of the points previously covered in order to insure the continuity of the fitting surfaces. Such moving area fitting is performed by causing the structure of FIG. 3 to operate on successive sets of data points, which sets include common points representing the overlap.

Trace interpolation is performed along the structural dip by trace synthesizer 140 of FIG. 1A by finding the time differential of the time surface between the interpolated point and the surrounding seismic traces and generating the appropriate data, which forms the desired synthesized seismic trace. The amplitude of the interpolated trace is reconstructed from the amplitudes of the surrounding traces as weighted by the previously mentioned weighting factors, specifically the distances between the arbitrary point and the known data points and the semblance coefficients.

The structure shown in FIG. 4 is used to compute the interpolated data and synthesized seismic traces in accordance with the following equation:

$$G(x_o, y_o, t_o) = \sum_{i=1}^{M} a_i S(x_i, y_i, t_o + \Delta t_i) / \sum_{i=1}^{M} a_i \quad (12)$$

In the equation,
$G(x_o, y_o, t_o)$ is the amplitude of an interpolated trace at an arbitrary location $(x_o, y_o)$ and time slice $t_o$
$(x_i, y_i)$ are coordinates of $i^{th}$ seismic trace $\Delta t_i = T(x_i, y_i) - T(x_o, y_o)$
$S(x_i, y_i, t_o + \Delta t_i)$ is the amplitude of seismic trace at location $(x_i, y_i)$ and time $t_o + \Delta t_i$
$a_i$ is the weighting factor for $i^{th}$ trace, and
M is the number of traces used for reconstruction.

More specifically, Equation (12) represents a summation of appropriately weighted seismic data, obtained at various points $x_i$, $y_i$ and at various times corresponding to the dip between the data point and the arbitrary point at which the trace is desired.

It is noted that M, the number of traces surrounding the interpolated trace that are summed to produce the interpolation output, is a function of Fresnel zone and should be time variant. The areal extent of Fresnel zone gets larger as the wave propagates more deeply and consequently more traces should be used for reconstruction. The weighting coefficients $a_i$ decay as an inverse of the distance with a power factor between 1 and 2 according to Kirchoff's Wave Theory. The coefficients $a_1$ are also further modified by the semblance coefficient to weight the good dip data modre heavily. The coefficients $a_i$ expressed in mathematical form are given by Equation (13):

$$a_i = [1/(1+r_i)^n] \times C \quad (13)$$

where $r_i$ is the distance between $(x_o, y_o)$ and $(x_i, y_i)$
C is the semblance coefficient, and
n is the power factor. In the preferred embodiment, the value of n is 1.5.

The trace synthesizer 140 performs the interpolation function and the weighting function, and includes structure shown in FIG. 4 for performing thesde functions. Specifically, a weighting coefficient calculating circuit 142 receives the semblance coefficients output by the semblance coefficient calculator 122 on line 128, together with the x, y coordinate locations associated with the two dimensional seismic data points, in order to compute the weighting coefficient in accordance with Equation (13). As will be appreciated, calculating circuit 142 may be provided in the form of a programmed digital computer.

An interpolator circuit 144, similarly comprised of programmed computing apparatus, is provided for calculating the results of Equation (12). As is apparent from the equation, interpolator circuit 144 is connected to receive inputs from the surface calculator 130, to permit computation of $\Delta t_i$ in Equation (12). Additional inputs to the interpolator are the coefficients determined by weighting coefficient calculating circuit 142 and the coordinates of the arbitrary point for which it is desired to synthesize a seismic trace. The two dimensional seismic data previously obtained are also input to the interpolator as needed.

The resulting values $G(x_o, y_o, t_o)$ output by interpolator 144 represent seismic data obtainable at a point $(x_o, y_o)$ for a time $t_o$, as dependent upon the surface equation for the surveyed structure computed by the surface calculator 130. The present invention thus provides a synthesized seismic trace for any arbitrary point as a function, inter alia, of the seismic data obtained at other points of the calculated representation of the structure, of the distance between the known data points and the arbitrary point, and of the semblance coefficient of the apparent dip at the known data points.

It is recognized that large amounts of data must be manipulated to achieve the above described function. Advantageously, the present invention does not require use of computing and calculating devices having a storage capable of storing all the data. Devices with reduced storage capability may be used upon recognition that, in accordance with Equation (13), the contribution of data from far distant data points diminishes and, beyond some distance, is effectively zero. Accordingly, the inventive method and apparatus provide and require storage for data from only a limited number of data points, from an area proximate the arbitray point in the computation represented by Equation (13) as well as in the computation of the surface T(x,y) represented by Equations (8) through (9). Specifically, data from successive areas $A_1, A_2, \ldots, A_N$ are used for computation of a portion of surface T(x,y) and of the desirred seismic data for points within these areas. Preferably, for every set of desired points an area may be defined including these points and a sufficient number of data points removed therefrom by distances short enough to permit contributions to Equations (12) and (13). Thus, the surface equation T(x,y) need only be determined for one area at a time, rather than for the entire surface at once. The complexity of the functions performed by the structure of FIG. 3 is thus significantly diminished.

In order to assure continuity of the calculated surface, the areas $A_1, A_2, \ldots$ are selected to overlap one another for a number of data points. Preferably, 50% overlap is provided for the areas to provide substantial continuity of the calculated surface which is thus calculated in a piecemeal, "moving area", technique. Seismic data for any point may thus be calculated from the seismic data for data points of a particular area with the aid of the surface representation obtained by a least-squares fit for that area. Of course, the area selected for computation of the surface may be smaller than the area containing all points making a contribution to the seismic trace to be synthesized for the arbitrary point. Thus, data from points in a number of the areas may be used in Equations (12) and (13).

In operation, the contribution of the known seismic data to the desired point $(x_0, y_0)$ by the summation of Equation (12) is determined by areas. The contributions of each known data point $(x_i, y_i)$ in one area of the surveyed structure, represented by $T(x, y)|A_k$, are summed over the index i for points within area $A_k$. Subsequently, when the mathematical surface function $T(x,y)|A_{k+1}$ is determined for the next overlapping area, the contribution of seismic data from data points within this area is made to Equation (12) for the seismic trace to be synthesized for the arbitrarily located point.

After computation of an entire seismic trace for the arbitrary point $(x_0, y_0)$, a further point is selected as a new location for the "arbitrary" point, in order to synthesize yet an additional seismic trace. A set of such seismic traces may be generated for a plurality of points selected to represent a seismic line, for example, at any desired orientation, whether parallel, perpendicular, or inclined to the orientation of the actual seismic lines used in obtaining the two dimensional data. There is thus no restriction on the orientation of the seismic lines with respect to one another or on the arbitrary locations for data synthesis with respect to the seismic lines.

Such a combination of individually calculated seismic traces is relatively straightforward and performed in a combining device 146. It is noted that such a combining apparatus may in fact merely be a form of a serial-to-parallel converter, in which the serially generated seismic traces for each of a plurality of points are sequentially (i.e., serially) input and which, after temporary storage, outputs the traces in unison (i.e. in parallel), representing data obtainable by an entire seismic line of geophones. Alternatively, the combining device may include output display or printing devices for displaying or printing the individual seismic traces sequentially, with physical signal displacement corresponding to signals provided by a seismic line. In such a configuration, storage or refresh circuitry, or a print carrying medium, may be used to store the previously output signals for combination with a currently output signal, to provide the "parallel" representation of the output of an entire line of geophones.

Since Equation (12) provides the seismic data at arbitrary time slices, the present invention thus provides plan views at different time slices, and may be used to generate a sequence of such views, or a sequence of vertical elevations, for sequential viewing as a "movie".

Preferably, regridding of two dimensional data as described above should be performed on unmigrated stack data so that a three dimensional migration may be performed on the regridded three dimensional data. It is noted that unmigrated data contains both reflection and diffraction events. The present invention fits a surface to accommodate both events. Although this procedure may seem odd, it should be understood that when the surface fitting is performed locally, as contemplated herein, the interpolation will honor whichever event comes out stronger. Because diffraction normally has a large dip, it is possible to interpolate reflecton and diffraction separately by fine tuning when the dip search; one run allows the diffraction to pass and another run allows the reflection to pass. A final section is produced by linearly superimposing the two outputs.

Figures 5, 6:
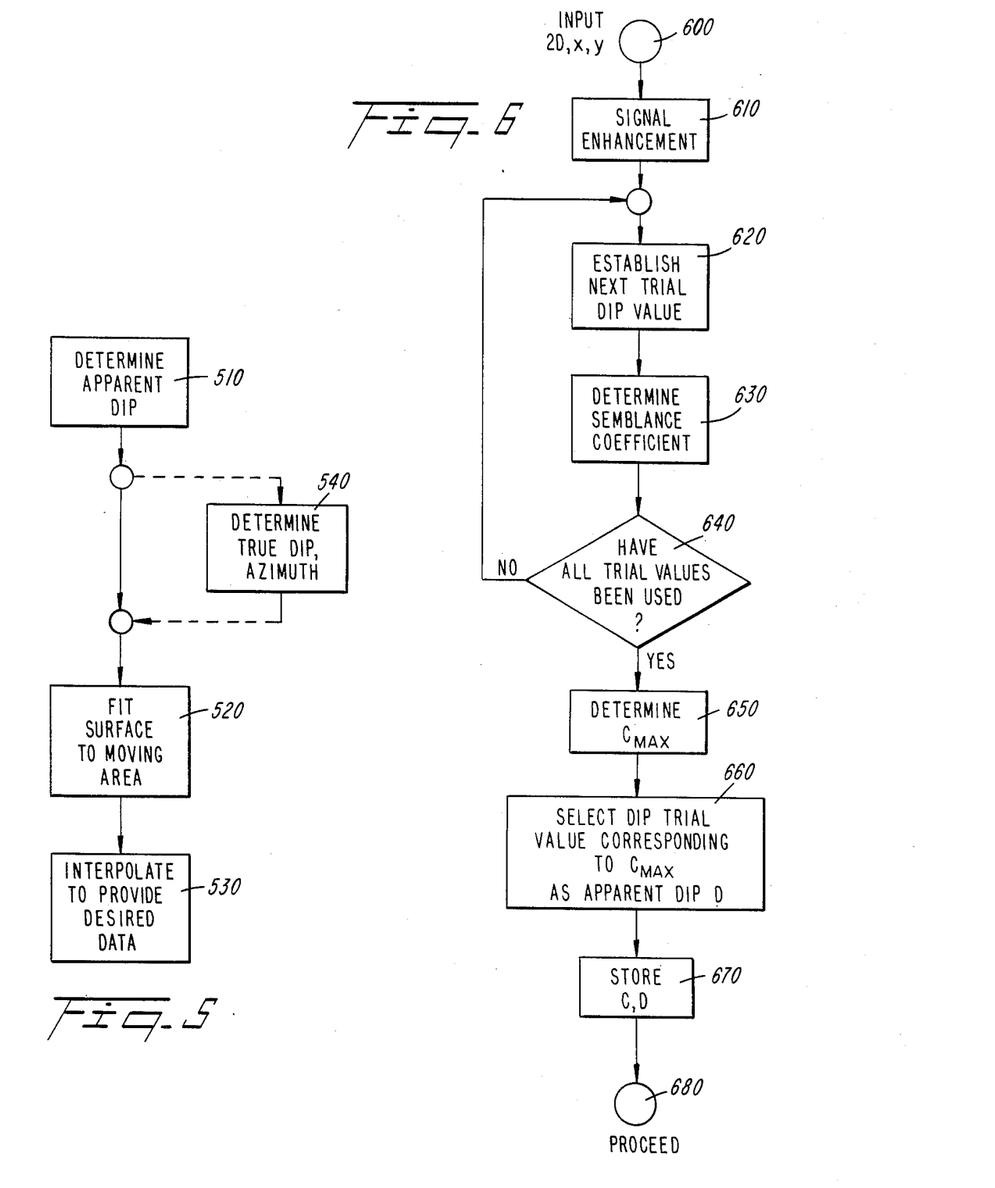
FIG. 5 broadly shows a number of the steps used in the present inventive method.
FIGS. 6, 7 and 8 show flow charts describing a sequence of steps which may be carried out by a computer in performing the inventive method.

It is thus noted that the present invention is utilized to provide a synthesized seismic trace by carrying out the method broadly illustrated in FIG. 5. Therein, at step 510, an apparent dip is determined from the seismic data received from a plurality of geophones. A surface is fitted to a moving area in step 520. The desired data are obtained by interpolation at step 530. Additionally, an optional step 540 may be provided, wherein true dip and/or azimuth are obtained.

Figure 7:
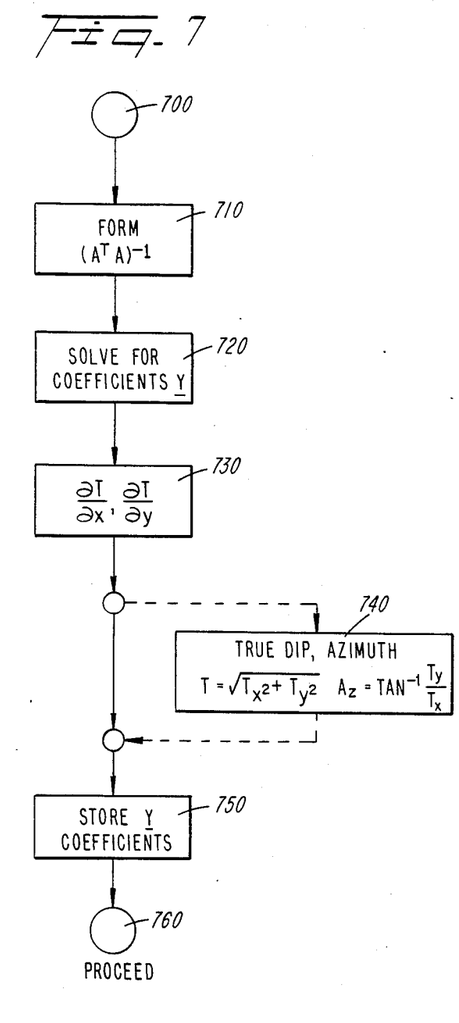
Figure 8:
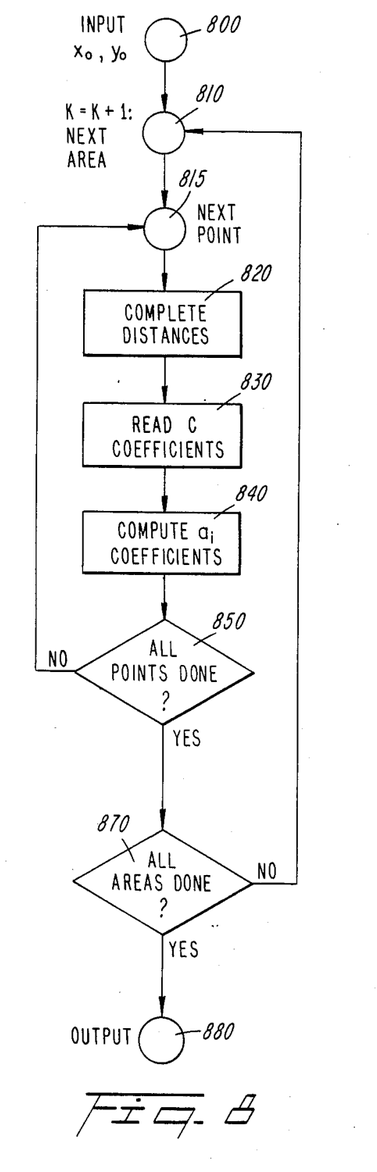

In more specific detail, the inventive method may be carried out by a computer programmed to perform the steps shown in FIGS. 6, 7 and 8. In FIG. 6, at step 600 there is initially input an amount of two dimensional seismic data along with the coordinates of the various test points. At step 610 an optional step of signal enhancement may be carried out, such as by performing a sinc function convolution.

At steps 620–660 there is determined an apparent dip angle for the input data. At step 620, a next trial dip angle value is established. In the initial pass through the procedure, step 620 provides an initial trial dip angle value. Thereafter, a semblance coefficient is determined at step 630 for the dip angle value set in step 620 and, upon determining that all trial dip values have been used at step 640, the maximum semblance coefficient is determined at step 650. If all the trial dip values have not been used, the inventive method requires establishing the next trial dip value at step 620 once again.

Upon determining the maximum semblance coefficient in step 650, the corresponding dip trial value is selected as the apparent dip $\partial T/\partial S$ in step 660. Both the semblance coefficient and the thus determined dip value are stored at step 670 for utilization in determining the weighting coefficients for the data of the various points. At step 680 the method proceeds to the steps shown in FIG. 7, wherein the three dimensional representation of the surveyed surface is obtained. Therein, the apparent dip data computed at steps 610–670 and output at step 680 are obtained at step 700. The x,y coordinates of the data from step 110 and the azimuth data from step 112 are merged in step 700. Thereafter, a matrix A is formed as a function of the coordinate and azimuth data for the various geophones on the seismic lines providing the two dimensional data and the matrix product $(A^TA)^{-1}$ is obtained at step 710. A matrix operation is performed at step 720 in accordance with Equation (9) in order to solve for the coefficients of an equation (such as Equation (5)) used to represent the three dimensional surface being surveyed. The apparent dip in the x and y directions is obtained at step 730 by a solution of Equations (6), as has been previously described. Finally, mathematical representation of the surface and azimuth may optionally be obtained in accordance with Equations (10) and (11) at step 740. The coefficients $\underline{Y}$ are stored at step 750. It should be noted that the inventive method utilizes a least-squares fitting of the surface to the data, as has been previously explained, rather than force fitting a $k^{th}$ order polynomial in order to reduce the effects of error in the measured data on the results.

In FIG. 8 there is shown the sequence of steps performed in order to synthesize the seismic trace at an arbitrary point. For each point whose location is input at step 800, the distances between the point and the actual data points for one area $A_k$ of the computed surface are obtained at step 820. At step 830 the semblance coefficients are obtained, and at step 840 the weighting coefficients are computed pursuant to Equation (13). At step 850 it is determined whether the contributions to the interpolated point from all pertinent data points in that area have been obtained. If not, the process returns to step 815 for selecting the next point in the area $A_k$. Thus, steps 820–850 are repeated until contributions from all of the points in a given area have been taken into account. The weighting coefficients for data in all the significant areas are then determined by repeating the sequence of steps 815–850 for each successive area $A_k$. At step 870 it is determined whether the contributions from all the areas have been provided. If not, the program returns, via step 810, to the 815–850 sequence. In this process the coefficients are used to weight the true seismic data previously obtained in order to derive a computed seismic data trace for the arbitrary point in accordance with Equation (12).

Thereafter, it is determined at step 870 whether data have been generated for all of the desired areas. If not, the procedure returns to step 810. Thus, until data are obtained for all the points in an area, the method repeats the steps 815–860. Once the data have been derived for each of the desired points, the method is terminated at step 880 and the data are provided as an output.

It should be recognized that in addition to the generation of synthesized seismic traces which may be used to obtain vertical profiles, the massive amounts of data generated in the present invention may be used to obtain sectional views of the surveyed structure at any orientation. Additionally, the inventive method and apparatus may be used to remove noise from standard two dimensional seismic data in obtaining the apparent dip associated therewith. By effectively calculating a synthesized trace for each point at which a seismic trace was in fact obtained, the least-squares surface fitting approach used in the invention is seen to be usable to smooth out the effects of random noise in the actually detected seismic signals.

In such a smoothing application of the invention, although the weighting coefficient will give greatest weight to the actual data obtained at a particular point, the semblance coefficient associated with the weighting factor will tend to deemphasize such data when they are in fact noise laden and erroneous. Moreover, since the surface is obtained after a least-squares fitting, random noise associated with the various traces will be smoothed out since the surface is not required to conform to any anomalous data points or to data exhibiting significant variation from neighboring points.

The foregoing specification describes a method and apparatus for synthesizing accurate seismic traces obtainable at arbitrary points, as interpolations of previously obtained seismic data. Accordingly, data may be obtained for points at any density, thus permitting the generation of three dimensional data from two dimensional data previously obtained.

The inventive technique may be applied to automatic mapping of surveyed geologic structures, since the availability of three dimensional, closely packed, data leads to the feasibillity of displaying the same in a proper perspective such as horizontal time slicing, so that an interpreter only needs to trace reflection horizons at successive time steps. Additionally, fault patterns may be better delineated with three dimensional data since the faults may be viewed from different angles. Time slices may be provided in a "movie" format, enabling a production geologist or engineer to look at a production field in snapshots available for various depths. By applying the technique to real data, there is provided a significant enhancement of the data by reducing noise and an improvement of signal to noise ratio.

The foregoing description of the preferred embodiment of the invention has been presented for purposes of illustration and description. It is not intended to be exhaustive or to limit the invention to the precise form disclosed. Obvious modifications or variations are possible in light of the above teaching. For example, other computational techniques or devices may be used. The preferred embodiment was chosen and described to provide the best illustration of the principles of the invention and its practical application, thereby to enable one of ordinary skill in the art to utilize the invention in various embodiments and with various modifications as are suited to the particular use contemplated. It is intended that the scope of the invention be defined by the claims appended hereto.

We claim:

1. A seismic trace synthesizer for providing densely packed high resolution three dimensional seismic data, representing a geological structure, from sparse two dimensional seismic signal data representative of the structure, comprising:
   (a) input means for inputting said two dimensional seismic signal data;
   (b) first calculating means connected to said input means for calculating from said two dimensional data apparent dip characteristics of the geological structure at various points;
   (c) second calculating means for determining from said two dimensional data and from said calculated apparent dip characteristics a three dimensional surface and for generating data representing said surface; and
   (d) trace generating means for combining said data representing the determined three dimensional surface with said two dimensional seismic data and for generating therefrom a synthesized seismic signal corresponding to a seismic trace obtainable at a point having an arbitrary predetermined position.

2. A seismic trace synthesizer as recited in claim 1, further comprising
   second input means for inputting data identifying said arbitrary point position; and
   wherein said trace generating means comprises
   third calculating means responsive to said second input means input data identifying said arbitrary point position and to said data representing said three dimensional surface generated by said second calculating means for calculating, as a function of said location, said input seismic signal data and said three dimensional surface data, said seismic trace obtainable by a seismic receptor at said arbitrary position.

3. A seismic trace synthesizer as recited in claim 2, further comprising a storage means for storing said calculated seismic data.

4. A seismic trace synthesizer as recited in claim 3, further comprising output means for outputting said calculated seismic data from said storage means thereby providing data representative of said geologic structure packed at a predetermined density determined by the density of position locations input to said second input means.

5. A seismic trace synthesizer as recited in claim 4, wherein said output means is operable for displaying said calculated seismic data from said storage means together with said two dimensional data.

6. A seismic trace synthesizer as recited in claim 4, wherein said output means comprises means for printing said data.

7. A seismic trace synthesizer as recited in claim 2, wherein said third calculating means comprises interpolating means including weighting means for providing greater weight to two dimensional seismic data signals obtained at points closer to said arbitrary pickup point than to two dimensional seismic data signals obtained at points further removed from said arbitrary point in calculating said synthesized seismic data signal obtainable at said arbitrary pickup point.

8. A seismic trace synthesizer as recited in claim 2, wherein said first calculating means comprises means for calculating semblance coefficients for the calculated apparent dip characteristic for the various points associated with said apparent dip characteristic, and said third calculating means comprising interpolating means including weighting means for providing greater weight to two dimensional seismic data associated with points having higher semblance coefficients than to two dimensional seismic data associated with points having lower semblance coefficients when calculating said three dimensional seismic data obtainable at said arbitrary pickup point.

9. A seismic trace synthesizer as recited in claim 1, wherein said first calculating means comprises means for obtaining derivative data for said two dimensional data with respect to a direction of orientation of a seismic line of pickup transducers used to obtain said two dimensional data and said second calculating means comprises means for determining said derivative data and from azimuthal data for said line of pickup transducers partial derivatives of said two dimensional data representing said structure with respect to component directions thereof.

10. A seismic trace synthesizer as recited in claim 9 wherein said second calculating means further comprises means for deriving said three dimensional data from said two dimensional data together with said partial derivatives.

11. A seismic trace synthesizer as recited in claim 1 wherein said second calculating means is operable for performing calculations solving space and time domain equations to determine said three dimensional surface.

12. A seismic trace synthesizer as recited in claim 1 wherein said second calculating means is operable for determining a time sequence of surfaces for successive, moving, overlapping areas by using successive sets of two dimensional data points, the successive sets having common points representing an overlap of the successive areas.

13. A seismic trace synthesizer as recited in claim 1 wherein said input means includes arbitrarily placed seismic lines having arbitrary orientations relative to one another.

14. Apparatus for converting two dimensional seismic data signals representing a seismic survey of a geologic surface to three dimensional seismic data signals comprising:

(a) input means for receiving said two dimensional data signals;

(b) semblance calculating means for calculating semblance coefficients for apparent dip values at several points based on said two dimensional data signals;

(c) apparent dip calculating means responsive to said semblance calculating means for obtaining apparent dip of the geologic surface surveyed by said two dimensional data signal;

(d) seismic data calculating means responsive to said apparent dip calculating means for synthesizing a seismic data signal trace obtainable at an arbitrary location intermediate locations actually surveyed in said two dimensional seismic data signals, including:

(e) surface calculating means for calculating a representation of the geologic surface surveyed by said two dimensional seismic data signals from the apparent dip calculated by said apparent dip calculating means and for generating data representing a three dimensional surface function corresponding to the calculated surface representation; and (f) synthesizing means responsive to said surface calculating means for determining and synthesizing from said generated surface data and from said two dimensional data signals a seismic trace receivable at said arbitrary location.

15. Apparatus as recited in claim 14 wherein said apparent dip calculating means comprises means for obtaining directional derivative data of the apparent dip with respect to an arbitrary azimuthal direction of a line used to obtain said two dimensional seismic data and said surface calculating means comprises means for obtaining, from said directional derivative data, partial derivative data for calculating the surface representation of the surveyed surface with respect to predetermined coordinate directions.

16. Apparatus as recited in claim 14 further comprising combining means for combining a plurality of said synthesized seismic data traces selected to represent pickup points along a hypothetical seismic line, thereby to provide synthesized seismic data representative of a survey along a seismic line at a hypothetical location.

17. Apparatus as recited in claim 14 wherein said synthesizing means is responsive to said semblance calculating means for weighting said two dimensional data received at particular points by semblance coefficients associated with apparent dip for those points in synthesizing said seismic trace for said arbitrary location.

18. Apparatus for regridding seismic signals received at specified points and representing two dimensional seismic data corresponding to a geologic structure to provide three dimensional seismic data representing the structure comprising:

(a) first calculating means for calculating from said received seismic data a three dimensional surface representing said geologic structure;

(b) second calculating means for calculating from said calculated three dimensional surface additional seismic data corresponding to said geologic structure and detectable at an additional point other than said specified points; and (c) generating means for generating seismic signals representing said additional seismic data and receivable at said additional point.

19. A method for regridding seismic signals received at specified points and representing two dimensional seismic data corresponding to a geologic structure to provide three dimensional seismic data representing the structure comprising the steps of:
 (a) on a programmed computer calculating a three dimensional surface representing said geologic structure;
 (b) based on the calculated three dimensional surface, calculating on said programmed computer additional seismic data corresponding to said geologic structure and detectable at an additional point other than said specified points; and
 (c) generating seismic signals representing said additional seismic data and receivable at said additional point.

20. A method as recited in claim 19 wherein said first mentioned calculating step comprises the further steps of:
 (a) determining, from said two dimensional data, apparent dip characteristics of the geologic structure for points at which the signals were received;
 (b) together with said apparent dip characteristics, determining respective semblance coefficients associated therewith for said points at which said signals were received; and
 (c) determining, from said apparent dip characteristic and from location data identifying a particular point, the three dimensional surface characteristic of the geologic structure.

21. A method as recited in claim 20 wherein said third determining step comprises the further step of programmably solving a partial differential equation of the type $$\frac{\partial T}{\partial S} = \frac{\partial T}{\partial x} \frac{\partial x}{\partial S} + \frac{\partial T}{\partial y} \frac{\partial y}{\partial S}$$

to obtain said true dip characteristic.

22. A method as recited in claim 20 wherein said step of calculating a three dimensional surface comprises the step of
 providing least-squares fitting of a surface to a first set of said points at which said signals were received, thereafter providing a least-squares fitting of a second surface to a second set of said points at which said signals were received, together with the step of selecting said second set of points to overlap some of said points included in said first set of points.

23. A method as recited in claim 20 wherein said step of generating said seismic signals receivable at said additional point comprises the step of combining, in accordance with said three dimensional surface characteristic of the geologic structure, a plurality of signals received at said specified points.

24. A method as recited in claim 23 wherein said step of combining further comprises the step of weighting said plurality of signals in accordance with said semblance coefficients respectively associated with said specified points.

25. A method as recited in claim 23 wherein said step of combining further comprises the step of weighting said plurality of signals in accordance with distances between said additional point and said specified points.

26. A method for providing seismic signals including three dimensional seismic data corresponding to a geologic structure comprising the steps of:
 (a) receiving seismic signals representing seismic data corresponding to said structure at specified points;
 (b) calculating a three dimensional surface representing said geologic structure;
 (c) based on the calculated three dimensional surface, calculating additional seismic data corresponding to said geologic structure and detectable at an additional point other than said specified points; and
 (d) generating seismic signals representing said additional seismic data receivable at said additional point.

27. Apparatus for regridding seismic signals received at specified points and representing two dimensional seismic data corresponding to a geologic structure to provide three dimensional seismic data representing the structure comprising:
 (a) first calculating means for calculating from said received seismic signals a three dimensional surface representing said geologic structure;
 (b) second calculating means for calculating from said received seismic signals additional seismic data corresponding to said geologic structure and detectable at an additional point other than said specified points; and
 (c) generating means for generating converted seismic signals including signals representing said additional seismic data and receivable at said additional point.

28. Apparatus as recited in claim 27 further comprising output means for outputting the converted seismic signals.

29. Apparatus as recited in claim 28 wherein said output means comprises means for providing hard copy output of said converted seismic signals.

30. Apparatus as recited in claim 28 wherein said output means comprises means for displaying said converted seismic signals.

31. A method for regridding seismic signals received at specified points and representing two dimensional seismic data corresponding to a geologic structure to provide three dimensional seismic data representing the structure comprising the steps of:
 (a) on a programmed computer calculating from said received seismic signals a three dimensional surface representing said geologic structure;
 (b) based on the calculated three dimensional surface, calculating on said programmed computer additional seismic data corresponding to said geologic structure and detectable at an additional point other than said specified points; and
 (c) generating seismic signals representing said additional seismic data and receivable at said additional point.

32. A method as recited in claim 31 comprising the further step of outputting said generated seismic signals.

33. A method as recited in claim 32 wherein said outputting step comprises the step of producing a hard copy representation of said generated seismic signals.

34. A method as recited in claim 32 wherein said outputting step comprises the step of displaying said generated seismic signals.

* * * * *

UNITED STATES PATENT AND TRADEMARK OFFICE
CERTIFICATE OF CORRECTION

PATENT NO. : 4,672,545

DATED : June 9, 1987

INVENTOR(S) : Jia-Wen Lin and Tom C. Holloway

It is certified that error appears in the above-identified patent and that said Letters Patent is hereby corrected as shown below:

At column 7, line 54, change "abovedescribed" to --above-described--.

At column 9, lines 18 and 19, change equation (7) to read:
--$D \equiv \partial T/\partial S = (2x\cos\gamma)a + (2y\sin\gamma)b + (y\cos\gamma + x\sin\gamma)c + (\cos\gamma)d + (\sin\gamma)e$--

At column 9, lines 43 - 52, change to read as follows:
--$D_1 = (2x_1\cos\gamma_1)a + (2y_1\sin\gamma_1)b + (y_1\cos\gamma_1 + x_1\sin\gamma_1)c + (\cos\gamma_1)d + (\sin\gamma_1)e$ --$D_2 = (2x_2\cos\gamma_2)a + (2y_2\sin\gamma_2)b + (y_2\cos\gamma_2 + x_2\sin\gamma_2)c + (\cos\gamma_2)d + (\sin\gamma_2)e$ --$D_N = (2x_N\cos\gamma_N)a + (2y_N\sin\gamma_N)b + (y_N\cos\gamma_N + x_N\sin\gamma_N)c + (\cos\gamma_N)d + (\sin\gamma_N)e$--

At column 9, line 57, change "$\underset{\sim}{A}\;\underset{\sim}{Y} = \underset{\sim}{T}$" to --$\underline{A}\;\underline{Y} = \underline{T}$--.

At column 9, line 64, change "$\underset{\sim}{T}$" to --$\underline{T}$--.

At column 10, in the matrix shown at lines 2 through 8, change to read as follows:

UNITED STATES PATENT AND TRADEMARK OFFICE
CERTIFICATE OF CORRECTION

PATENT NO. : 4,672,545

DATED : June 9, 1987

INVENTOR(S) : Jia-Wen Lin and Tom C. Holloway

It is certified that error appears in the above-identified patent and that said Letters Patent is hereby corrected as shown below:

$$\underline{A} = \begin{bmatrix} 2x_1\cos\gamma_1 & 2y_1\sin\gamma_1 & y_1\cos\gamma_1 + x_1\sin\gamma_1 & \cos\gamma_1 & \sin\gamma_1 \\ 2x_2\cos\gamma_2 & 2y_2\sin\gamma_2 & y_2\cos\gamma_2 + x_2\sin\gamma_2 & \cos\gamma_2 & \sin\gamma_2 \\ 2x_N\cos\gamma_N & 2y_N\sin\gamma_N & y_N\cos\gamma_N + x_N\sin\gamma_N & \cos\gamma_N & \sin\gamma_N \end{bmatrix}$$

UNITED STATES PATENT AND TRADEMARK OFFICE
CERTIFICATE OF CORRECTION

PATENT NO. : 4,672,545

DATED : June 9, 1987

INVENTOR(S) : Jia-Wen Lin and Tom C. Holloway

It is certified that error appears in the above-identified patent and that said Letters Patent is hereby corrected as shown below:

At col. 4, line 33, change "aspect" to --aspects--.

At col. 7, line 44, change "above described" to --above-described--;

line 48, change "seiismic" to --seismic--.

At col. 8, line 23, change "againg" to --again--.

At col.10, line 40, change "coefficienfts" to --coefficients--;

line 42, change "above mentioned" to --above-mentioned--;

line 68, change ",, the semblance" to --, the semblance--.

Signed and Sealed this

First Day of March, 1988

Attest:

DONALD J. QUIGG

Attesting Officer

Commissioner of Patents and Trademarks